(12) United States Patent
Norisada et al.

(10) Patent No.: US 10,184,779 B2
(45) Date of Patent: Jan. 22, 2019

(54) STRETCHABLE ELECTRODE, SENSOR SHEET AND CAPACITIVE SENSOR

(71) Applicant: Bando Chemical Industries, Ltd., Hyogo (JP)

(72) Inventors: Hideki Norisada, Hyogo (JP); Hideo Otaka, Hyogo (JP)

(73) Assignee: BANDO CHEMICAL INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/039,847

(22) PCT Filed: Nov. 17, 2014

(86) PCT No.: PCT/JP2014/080367
§ 371 (c)(1),
(2) Date: May 26, 2016

(87) PCT Pub. No.: WO2015/079951
PCT Pub. Date: Jun. 4, 2015

(65) Prior Publication Data
US 2016/0377409 A1    Dec. 29, 2016

(30) Foreign Application Priority Data
Nov. 28, 2013    (JP) .................. 2013-246438

(51) Int. Cl.
*G01L 7/08* (2006.01)
*G01L 9/12* (2006.01)
(Continued)

(52) U.S. Cl.
CPC ............... *G01B 7/22* (2013.01); *G01L 1/146* (2013.01); *H01G 5/011* (2013.01); *H01G 11/36* (2013.01); *Y02E 60/13* (2013.01)

(58) Field of Classification Search
None
See application file for complete search history.

(56) References Cited

U.S. PATENT DOCUMENTS 7,813,108 B2 * 10/2010 Liu ................ H01G 11/36
361/516
7,949,017 B2 * 5/2011 Marciante ........... H01S 3/109
372/3
(Continued)

FOREIGN PATENT DOCUMENTS

CN    101950224 A    1/2011
CN    102044627 A    5/2011
(Continued)

OTHER PUBLICATIONS

Machine translation of WO 2009/102077 A1.
(Continued)

*Primary Examiner* — Peter J Macchiarolo
*Assistant Examiner* — Jermaine L Jenkins
(74) *Attorney, Agent, or Firm* — Lewis Roca Rothgerber Christie LLP

(57) ABSTRACT

Provided is a stretchable electrode which has excellent flexibility, stretchability and electrical conductivity and is capable of suppressing increase of the electric resistance in being elongated and the occurrence of variation in the electric resistance during repeated stretching and contracting. The stretchable electrode of the present invention comprises a base formed of an elastomer composition and an electrode main body integrated with the base, wherein the electrode main body is formed using multi-walled carbon nanotubes having a fiber length of 50 μm or more.

13 Claims, 13 Drawing Sheets

(51) Int. Cl.
*G01L 1/00* (2006.01)
*G01B 7/16* (2006.01)
*G01L 1/14* (2006.01)
*H01G 11/36* (2013.01)
*H01G 5/011* (2006.01)

(56) References Cited

U.S. PATENT DOCUMENTS

| | | | | |
|---|---|---|---|---|
| 8,361,608 | B1 * | 1/2013 | Hansen | B29C 70/882 |
| | | | | 428/294.4 |
| 8,850,897 | B2 * | 10/2014 | Eichhorn | B82Y 15/00 |
| | | | | 73/774 |
| 8,941,392 | B1 * | 1/2015 | Reese | A61B 5/1071 |
| | | | | 324/658 |
| 8,984,954 | B2 * | 3/2015 | Merrell | G01L 1/16 |
| | | | | 73/774 |
| 9,664,717 | B2 * | 5/2017 | Choi | B25J 13/084 |
| 2010/0286309 | A1 | 11/2010 | Noguchi et al. | |
| 2011/0006787 | A1 | 1/2011 | Kadono | |
| 2011/0094217 | A1 | 4/2011 | Chen et al. | |
| 2012/0177934 | A1 | 7/2012 | Vogel et al. | |
| 2015/0008798 | A1 * | 1/2015 | Kato | H02N 2/18 |
| | | | | 310/339 |
| 2015/0177079 | A1 * | 6/2015 | Eichhorn | G01L 9/0054 |
| | | | | 73/774 |
| 2015/0268106 | A1 * | 9/2015 | Otaka | G01L 1/146 |
| | | | | 73/780 |
| 2016/0011063 | A1 * | 1/2016 | Zhang | G01L 1/18 |
| | | | | 600/301 |

FOREIGN PATENT DOCUMENTS

| | | |
|---|---|---|
| CN | 102498595 A | 6/2012 |
| JP | 2007-154150 A | 6/2007 |
| JP | 2008-198425 A | 8/2008 |
| JP | 2010-97794 A | 4/2010 |
| JP | 2012-54192 A | 3/2012 |
| JP | 2012-82077 A | 4/2012 |
| JP | 2012-117892 A | 6/2012 |
| JP | 2012-533857 A | 12/2012 |
| JP | 2013-118128 A | 6/2013 |
| JP | 2013-147669 A | 8/2013 |
| JP | 5308603 B1 | 10/2013 |
| TW | 1394303 B1 | 4/2013 |
| TW | I 394303 B1 | 4/2013 |
| WO | 2009/102077 A1 | 8/2009 |
| WO | 2012/028686 A2 | 3/2012 |

OTHER PUBLICATIONS

English translation of JP 2012-117892 A in full text (obtained through the website of J-Plat-Pat).
English translation of JP 2013-118128 A in full text (obtained through the website of J-Plat-Pat).
English translation of JP 2010-97794 A in full text (obtained through the website of J-Plat-Pat).
English translation of JP 2012-82077 A in full text (obtained through the website of J-Plat-Pat).
English translation of JP 2013-147669 A in full text (obtained through the website of J-Plat-Pat).
English translation of JP 2008-198425 A in full text (obtained through the website of J-Plat-Pat).
International Search Report, corresponding PCT Application No. PCT/JP2014/080367 (4 pages).
Extended European Search Report issued in corresponding EP Application No. 14866289.3, dated Jul. 24, 2017, 7 pages.
Lipomi, D. J., et al., Skin-Like Pressure and Strain Sensors Based on Transparent Elastic Films of Carbon nanotubes, Nature Nanotechnology, vol. 6, Oct. 23, 2011, pp. 788-792.

* cited by examiner

Sectional View Taken on Line A - A

STRETCHABLE ELECTRODE, SENSOR SHEET AND CAPACITIVE SENSOR

CROSS REFERENCE TO RELATED APPLICATION(S)

The present application is a National Phase application and claims priority to and the benefit of International Application PCT/JP2014/080367, with an international filing date of Nov. 17, 2014, which claims the priority benefit of Japanese Application No. 2013-246438, filed Nov. 28, 2013, the contents of which are incorporated herein by reference in their entirety for all purposes.

DESCRIPTION

Technical Field

The present invention relates to a stretchable electrode, a sensor sheet using the stretchable electrode, and a capacitive sensor.

Background Art

In recent years, a stretchable and flexible electrode is demanded in electronic device fields such as soft sensors, various actuators and flexible display devices, medical material fields such as artificial muscles and artificial skins requiring stretchability.

As such a stretchable and flexible electrode, for example, a conducting member including a wire formed by drying a conductive paste composed of a polyurethane dispersion liquid and metal particles such as silver particles, and a flexible substrate is proposed in Patent Literature 1.

Further, as a flexible electrode which is excellent in flexibility and electric conductivity, a flexible electrode in which continuous conductive paths by carbon nanotubes composed of carbon fibers with a diameter of 0.5 to 80 nm and having carbon fibers extending three-dimensionally from a central site are formed in an elastomer, is proposed in Patent Literature 2.

CITATION LIST

Patent Literature

Patent Literature 1: Japanese Unexamined Patent Publication No. 2012-54192
Patent Literature 2: Japanese Unexamined Patent Publication No. 2008-198425

SUMMARY OF INVENTION

Technical Problem

However, in the conducting member described in Patent Literature 1, there are problems that since a wire portion responsible for electric conductivity is formed using a conductive paste including silver particles although stretchability as the conducting member is ensured, a conductive path is cut in elongating the electrode resulting in a large increase of electric resistance, or variation in the electric resistance becomes large during repeated stretching and contracting.

In the flexible electrode described in Patent Literature 2, although flexibility is ensured, there are problems that stretchability is inferior, electric resistance increases in being highly elongated, or variation in the electric resistance occurs during repeated stretching and contracting.

The present invention is made in view of such a situation, and it is an object of the present invention to provide a stretchable electrode which has excellent flexibility, stretchability and electrical conductivity and is capable of suppressing increase of the electric resistance in being elongated and the occurrence of variation in the electric resistance during repeated stretching and contracting.

Solution to Problem

In order to achieve the above-mentioned object, the present inventors have made earnest investigations, and consequently they have found that the aforementioned object can be achieved by forming an electrode main body with use of specific carbon nanotubes, and these findings have led to completion of the present invention.

A stretchable electrode of the present invention comprises a base formed of an elastomer composition and an electrode main body integrated with the base, wherein the electrode main body is formed using multi-walled carbon nanotubes having a fiber length of 50 µm or more.

In the stretchable electrode, the multi-walled carbon nanotube preferably has a fiber diameter of 5 to 30 nm.

The stretchable electrode can be suitably used for a sensor sheet.

A sensor sheet of the present invention is a sensor sheet using the stretchable electrode of the present invention, wherein the base is sheet-like and the electrode main body is disposed on both surfaces of the base, and the electrode main body disposed on one surface of the base and the electrode main body disposed on the other surface of the base are at least partially opposed to each other with the base interposed therebetween.

In the sensor sheet, the electrode main body is rectangular and plural rows of the electrode main bodies are disposed on both surfaces of the base.

A capacitive sensor of the present invention includes the sensor sheet of the present invention, a measurement instrument, and external conducting wires for connecting between the measurement instrument and electrode main bodies which the sensor sheet includes, wherein a portion in which the electrode main body disposed on one surface of the base and the electrode main body disposed on the other surface of the base are opposed to each other with the base interposed therebetween is a detection portion, and the measurement instrument measures an amount of strain due to deformation by measuring changes in capacitance in the detection portion.

Advantageous Effects of Invention

The stretchable electrode of the present invention includes the electrode main body formed with use of specific carbon nanotubes, and therefore it has high electrical conductivity, and has such excellent characteristics that increase of the electric resistance in being elongated and variation in the electric resistance during repeated stretching and contracting are extremely small.

The sensor sheet of the present invention can provide a sensor which is excellent in measurement accuracy and long-term reliability since it uses the stretchable electrode of the present invention which has the aforementioned characteristics.

The capacitive sensor of the present invention is excellent in measurement accuracy and long-term reliability since it includes the sensor sheet of the present invention.

DESCRIPTION OF EMBODIMENTS

Hereinafter, embodiments of the present invention will be described in reference to drawings.

A stretchable electrode of the present invention comprises a base formed of an elastomer composition and an electrode main body which is integrated with the base and formed of carbon nanotubes, wherein the electrode main body is formed using multi-walled carbon nanotubes having a fiber length of 50 μm or more.

Figure 1A:
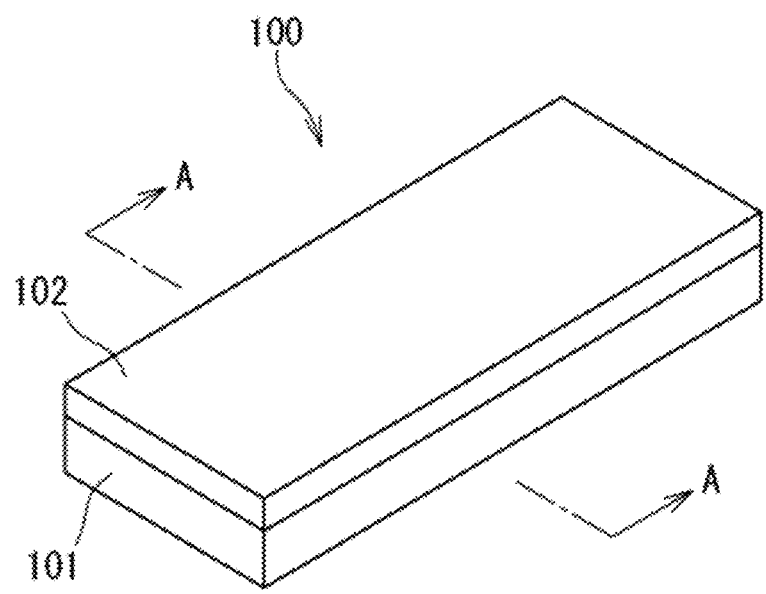
FIG. 1A is a perspective view schematically showing an example of a stretchable electrode of the present invention.
Figure 1B:
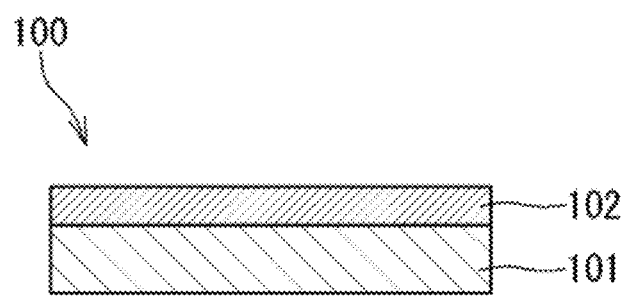
FIG. 1B is a sectional view taken on line A-A of FIG. 1B.

FIG. 1A is a perspective view schematically showing an example of a stretchable electrode of the present invention, and FIG. 1B is a sectional view taken on line A-A of FIG. 1A.

In the stretchable electrode 100 shown in FIGS. 1A and 1B, the electrode main body 102 formed using carbon nanotubes is laminated on and integrated with the whole top surface of a sheet-like base 101 formed of an elastomer composition.

The base is formed of an elastomer composition. Therefore, it is possible to ensure stretchability.

Examples of the elastomer composition include materials containing an elastomer, and other optional components used as required.

Examples of the elastomer include a natural rubber, an isoprene rubber, a nitrile rubber (NBR), an ethylene-propylene rubber (EPDM), a styrene-butadiene rubber (SBR), a butadiene rubber (BR), a chloroprene rubber (CR), a silicone rubber, a fluoro-rubber, an acrylic rubber, a hydrogenated nitrile rubber, a urethane elastomer and the like. These elastomers may be used singly, or may be used in combination of two or more thereof.

Among these elastomers, a urethane elastomer and a silicone rubber are preferred. The reason for this is that their permanent strains (or permanent elongation) are low.

Moreover, the urethane elastomer is particularly preferred because of more excellent adhesion to the carbon nanotube than the silicone rubber.

The urethane elastomer is formed by a reaction of at least a polyol component with an isocyanate component. Specific examples thereof include olefinic urethane elastomers containing olefinic polyol as a polyol component; ester-based urethane elastomers containing ester-based polyol as a polyol component; ether-based urethane elastomers containing ether-based polyol as a polyol component; carbonate-based urethane elastomers containing carbonate-based polyol as a polyol component; and castor oil-based urethane elastomers containing castor oil-based polyol as a polyol component. These urethane elastomers may be used singly, or may be used in combination of two or more thereof.

Further, the urethane elastomer may be used in combination of two or more of the aforementioned polyol components.

Examples of the olefinic polyols include EPOL (produced by Idemitsu Kosan Co., Ltd.) and the like.

Examples of the ester-based polyols include POLYLITE 8651 (produced by DIC Corporation) and the like.

Further, examples of the ether-based polyols include polyoxytetramethylene glycol, PTG-2000SN (produced by Hodogaya Chemical Co., Ltd.), polypropylene glycol, PREMINOL S3003 (produced by ASAHI GLASS CO., LTD.) and the like.

When the urethane elastomer is synthesized, a chain extender, a crosslinking agent, a catalyst, a vulcanization accelerator and the like may be added to a reaction system, as required.

Further, the elastomer composition may contain additives such as a plasticizer, an antioxidant, an age resistor and a coloring agent in addition to the elastomer.

The elastomer composition may further contain other components in accordance with use of the stretchable electrode.

Specifically, the elastomer composition may contain dielectric fillers of barium titanate or the like, for example, when the stretchable electrode of the present invention is used as a sensor sheet for measuring changes in capacitance (hereinafter, also referred to as a capacitive sensor sheet). Thereby, the capacitance C of the base can be increased. As a result of this, the detection sensitivity of the capacitive sensor sheet can be enhanced.

When the elastomer composition contains the dielectric fillers, the content of the dielectric filler in the elastomer composition is usually more than 0% by volume and about 25% by volume or less.

When the content of the dielectric filler is more than 25% by volume, the hardness of the base may be increased or the permanent strain of the base may be increased. Further, in forming a base made of a urethane elastomer, since viscosity of liquid before curing increases, formation of a thin film with high accuracy may become difficult.

The electrode main body is integrated with the base and formed using multi-walled carbon nanotubes having a fiber length of 50 μm or more.

The stretchable electrode of the present invention includes the electrode main body formed by using such multi-walled carbon nanotubes having a long fiber length, and therefore it has such excellent characteristics that electrical conductivity is high, the electric resistance increases little in being elongated and variation in the electric resistance during repeated stretching and contracting is small.

In contrast with this, when the fiber length of the aforementioned multi-walled carbon nanotube is less than 50 μm, the electric resistance of the stretchable electrode is largely increased as the stretchable electrode is stretched, and furthermore variation in the electric resistance during repeated stretching and contracting becomes extremely large. The fiber length is preferably 100 μm or more.

On the other hand, a preferred upper limit of the fiber length of the multi-walled carbon nanotube is 1000 μm. The multi-walled carbon nanotube having a fiber length more than 1000 μm is currently hard-to-find and hard-to-produce. Further, when the fiber length of the multi-walled carbon nanotube is more than 1000 μm, dispersion of the multi-walled carbon nanotubes is easily inadequate in applying a dispersion liquid of the multi-walled carbon nanotubes to form an electrode main body, and consequently there is a fear that the conductive path is hardly formed, resulting in insufficient electric conductivity of an electrode main body.

A lower limit of an average length of the multi-walled carbon nanotubes is preferably 100 μm, and an upper limit thereof is preferably 600 μm.

When the average length of the multi-walled carbon nanotubes is in the aforementioned range, it is possible to ensure, at a high level with more reliability, such excellent characteristics that electrical conductivity is high, the electric resistance increases little in being elongated and variation in the electric resistance during repeated stretching and contracting is small.

The fiber length of the multi-walled carbon nanotube may be determined by observing multi-walled carbon nanotubes with an electron microscope and measuring from an image of electron microscope observation.

Further, the average length of the multi-walled carbon nanotubes may be determined, for example, by calculating an average value of fiber lengths of multi-walled carbon nanotubes in ten locations randomly selected from the observation image of the multi-walled carbon nanotubes.

In the present invention, it is also important to use the multi-walled carbon nanotube as a carbon nanotube.

The reason for this is that when the single-walled carbon nanotube is used, the electric resistance becomes high, the electric resistance largely increases in being elongated, or the electric resistance varies significantly during repeated stretching and contracting even though using the carbon nanotube having a long fiber length. With respect to this, it is suspected that since the single-walled carbon nanotubes are commonly synthesized as a mixture of metallic carbon nanotubes and semiconductive carbon nanotubes, the presence of semiconductive carbon nanotubes causes high electric resistance, a large increase of electric resistance in being elongated, or significant variations of electric resistance during repeated stretching and contracting.

In addition, the possibility of forming an electrode main body having the same electric characteristics as in the electrode main body according to the present invention is not denied when the metallic carbon nanotubes are separated from the semiconductive carbon nanotubes and only metallic single-walled carbon nanotubes having a long fiber length are used. However, separation between the metallic carbon nanotubes and the semiconductive carbon nanotubes is not easy (particularly, in carbon nanotubes having a long fiber length) and complicated operations are required for separation between both carbon nanotubes. Therefore, in the present invention, from the viewpoint of ease of operation in forming the electrode main body and economic efficiency, the electrode main body is formed by using the multi-walled carbon nanotubes.

In the multi-walled carbon nanotube, the number of layers is not particularly limited, a double-walled carbon nanotube (DWNT) may be used, or a multi-walled carbon nanotube (MWNT) having three or more layers may be used (in the present specification, both carbon nanotubes are collectively referred to simply as a multi-walled carbon nanotube). Further, multi-walled carbon nanotubes different in number of layers may be used in combination.

A fiber diameter of the multi-walled carbon nanotube is not particularly limited; however, it is preferably 5 to 30 nm.

When the fiber diameter is less than 5 nm, dispersion of the multi-walled carbon nanotubes is deteriorated, and consequently the conductive path may not expand, resulting in insufficient electric conductivity of the electrode main body. On the other hand, when the fiber diameter is more than 30 nm, the number of carbon nanotubes is reduced even in the same weight, and therefore the electric conductivity may become insufficient.

An average fiber diameter of the multi-walled carbon nanotubes is not particularly limited; however, it is preferably 5 to 20 nm.

The multi-walled carbon nanotubes preferably have the purity of carbon of 99% by weight or more.

The carbon nanotubes may include a catalyst metal, a dispersant or the like in the production process of the carbon nanotubes, and when the carbon nanotubes containing a large amount of such components other than the carbon nanotube (impurities) are used, the reduction of electric conductivity or the variation in the electric resistance may be caused.

The multi-walled carbon nanotubes may be one produced by a publicly known production method; however, the multi-walled carbon nanotubes produced by a substrate growth method are preferred.

The substrate growth method is one of a CVD method, and a method in which a carbon source is supplied to a metal catalyst applied onto a substrate and carbon nanotubes are grown on the substrate to produce carbon nanotubes. The substrate growth method is a production method suitable for producing carbon nanotubes which have a relatively long fiber length and are leveled in fiber length. Therefore, the substrate growth method is suitable as a method for producing the carbon nanotubes used in the present invention in which it is one of technical features that an electrode main body is formed by using carbon nanotubes having a specific fiber length.

Further, when in the present invention, the carbon nanotubes are carbon nanotubes produced by a substrate growth method, the fiber length of the carbon nanotube is substantially the same as a length of growth of a CNT forest. Therefore, when the fiber length is measured with use of an electron microscope, a length of growth of the CNT forest may be measured.

In the present invention, it is important to use the multi-walled carbon nanotube having a fiber length of 50 μm or more as a carbon nanotube. When carbon nanotubes produced by the substrate growth method are used, multi-walled carbon nanotubes on a substrate in which a length of growth of a carbon nanotube (length of growth of a CNT forest) becomes 50 µm or more, may be used as the multi-walled carbon nanotube having a fiber length of 50 µm or more.

The electrode main body is formed by using the multi-walled carbon nanotubes having a fiber length of 50 µm or more. More specifically, the electrode main body is formed, for example, by applying a composition including the aforementioned multi-walled carbon nanotubes and a dispersion medium (hereinafter, also referred to as a carbon nanotube dispersion liquid), and then drying the dispersion liquid to remove the dispersion medium.

The carbon nanotube dispersion liquid may contain only the multi-walled carbon nanotubes besides the dispersion medium; however, it may contain other components other than carbon nanotubes together with the multi-walled carbon nanotubes.

Examples of other components described above include a binder component.

The binder component can serve as a binding material of the multi-walled carbon nanotubes. By containing the binder component, it is possible to improve adhesion of the electrode main body to the base and strength of the electrode main body itself. Moreover, since scattering of the multi-walled carbon nanotubes can be prevented in forming the electrode main body by a method described later, safety during forming the electrode main body can also be enhanced.

Examples of the binder component include a butyl-rubber, an ethylene-propylene rubber, polyethylene, chlorosulfonated polyethylene, a natural rubber, an isoprene rubber, a butadiene rubber, a styrene-butadiene rubber, polystyrene, a chloroprene rubber, a nitrile rubber, polymethylmethacrylate, polyvinylacetate, polyvinylchloride, an acrylic rubber, a styrene-ethylene-butylene-styrene block copolymer (SEBS), and the like. These binder components may be used singly, or may be used in combination of two or more thereof.

Further, as the binder component, a raw rubber (a natural rubber and a synthetic rubber not vulcanized) can also be used. When a material having relatively weak elasticity like this is used, followability of the electrode main body to the deformation of the base during stretching and contracting can be enhanced.

The binder component is preferably one whose solubility parameter (SP value $[(cal/cm^3)^{1/2}]$) is close to the solubility parameter of the elastomer constituting the base, and more preferably one in which an absolute value of a difference with the solubility parameter (SP value) of the elastomer constituting the base is 1 or less. The reason for this is that when both solubility parameters are closer to each other, the adhesion between the base and the electrode main body is improved.

In addition, in the present invention, the SP values are values calculated from Fedors's prediction method.

The binder component is particularly preferably similar in a type to the elastomer constituting the base. The reason for this is that the adhesion between the base and the electrode main body can be remarkably improved.

The carbon nanotube dispersion liquid may contain, besides the binder components as other components, additives for a binder component such as a crosslinking agent, a vulcanization accelerator and a vulcanization aid; an antioxidant, a plasticizer, a softening agent, a coloring agent and the like.

Herein, when the electrode main body contains a plasticizer and the base also contains a plasticizer, concentrations of both plasticizers are preferably the same. The reason for this is that a transition of the plasticizer between the base and the electrode main body can be prevented, and thereby the occurrence of warpage and wrinkle in the stretchable electrode can be suppressed.

Further, the carbon nanotube dispersion liquid may contain carbon nanotubes other than the multi-walled carbon nanotubes having a fiber length of 50 µm or more within a range which does not impair electroconductive characteristics of the electrode main body to be formed.

Naturally, other components described above may not be necessarily contained, and the electrode main body may be substantially composed of only the multi-walled carbon nanotubes. Adequate adhesion between the electrode main body and the base can also be ensured in this case, and the multi-walled carbon nanotubes are brought into firm contact with the base by a van der Waals' force or the like.

The content of the multi-walled carbon nanotube in the electrode main body is not particularly limited as long as the multi-walled carbon nanotube has a concentration at which the electric conductivity is exerted, and the content, but varies depending on a type of a binder component when containing the binder component, is preferably 0.1 to 100% by weight with respect to the whole solid content of the electrode main body.

Further, when the content of the multi-walled carbon nanotube is increased, the electric conductivity of the electrode main body can be improved. Therefore, required electric conductivity can be ensured even though a thickness of the electrode main body is reduced. As a result of this, it becomes easier to reduce a thickness of the stretchable electrode or ensure the flexibility of the stretchable electrode.

An average thickness of the electrode main body is preferably 0.1 µm or more and 10 µm or less in the case where a configuration of the electrode main body is in the form of laminae as shown in FIGS. 1A and 1B. When the average thickness of the electrode main body is within the aforementioned range, the electrode main body can exert excellent followability to the stretch and contraction of the base during stretching and contracting.

In contrast with this, when the average thickness of the electrode main body is less than 0.1 µm, there is a possibility that electric conductivity may be insufficient. On the other hand, when the average thickness of the electrode main body is more than 10 µm, there is a possibility that the stretchable electrode itself becomes hard by a reinforcing effect of the carbon nanotubes resulting in insufficient stretchability.

In addition, when the configuration of the electrode main body is in the form of laminae, the average thickness of the electrode main body can be measured by using a laser microscope (e.g., VK-9510 manufactured by KEYENCE Corporation).

Specifically, for example, when the electrode main body is laminated on a part of the surface of the base, the electrode main body laminated on the surface of the base is scanned in increments of 0.01 µm in a direction of thickness to measure a three-dimensional shape thereof, and then an average height of a rectangular area 200 µm long×200 µm wide is measured in each of a region where an electrode layer is laminated on the surface of a dielectric layer and a region where the electrode layer is not laminated on the surface of the dielectric layer, and a difference in the average height between the two areas may be taken as an average thickness of the electrode main body.

Figure 2A:
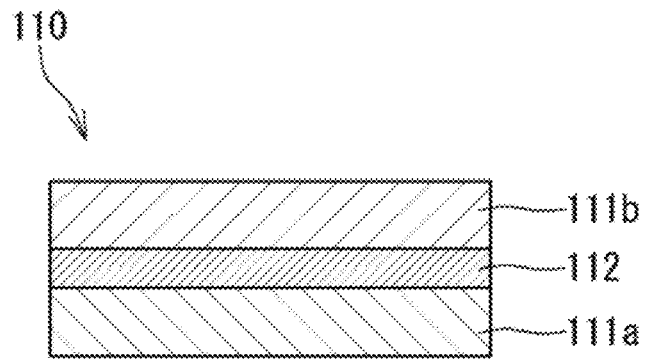
FIGS. 2A to 2C are respectively a sectional view schematically showing another example of the stretchable electrode of the present invention.
Figure 2B:
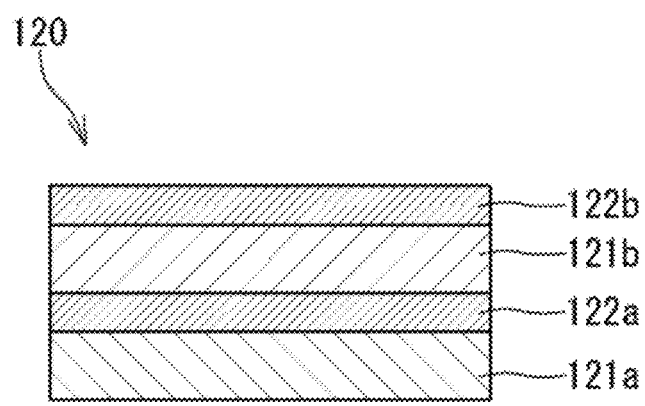

The configuration of the stretchable electrode of the present invention is not limited to the configuration shown in FIGS. 1A to 1B, and, for example, configurations shown in FIGS. 2A to 2B may be employed.

FIGS. 2A to 2B are sectional views schematically showing other examples of the stretchable electrode of the present invention, respectively.

The stretchable electrode 110 shown in FIG. 2A has a configuration in which the electrode main body 112 is sandwiched between two sheet-like bases 111a and 111b. In the stretchable electrode having such a configuration, breakage of the electrode main body by external shock more hardly occurs.

The stretchable electrode 120 shown in FIG. 2B has a configuration in which two sheet-like bases 121a and 121b and two layers of the electrode main bodies 122a and 122b are alternately laminated, and the electrode main body has a multi-layer structure.

In addition, when the electrode main body has a multi-layer structure, the number of the layers is not limited to two layers as shown in FIG. 2B, and may be three layers or more. Further, top and bottom surfaces of a laminated electrode main body may be protected by the base.

Figure 2C:
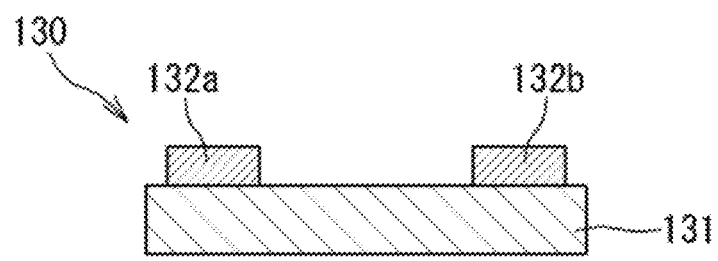

The stretchable electrode 130 shown in FIG. 2C has a configuration in which two rows of electrode main bodies 132a and 132b are laminated on a top surface of a sheet-like base 131. When the electrode main body is laminated on one surface of the sheet-like base, the electrode main bodies of not only two rows but also plural rows may be laminated, or a circuit pattern formed of carbon nanotubes may be formed as the electrode main body.

Naturally, a configuration of the stretchable electrode of the present invention is not limited to the configuration previously illustrated, and various configurations may be employed in accordance with design of the stretchable electrode.

The stretchable electrode of the present invention has the constitution described above, and therefore it has excellent flexibility, stretchability and electrical conductivity, and has such excellent characteristics that increase of the electric resistance in being elongated and variation in the electric resistance during repeated stretching and contracting are extremely small.

In the stretchable electrode, it is preferred that when a cycle of stretching and contracting in which a cycle of elongating the stretchable electrode by 100% in a uniaxial direction from a state of elongation-free and then returning the electrode to a state of elongation-free is designated as one cycle, is repeated 1000 times, an increase rate of electric resistance at 100% elongation to electric resistance at elongation-free [{(electric resistance at 100% elongation)−(electric resistance at elongation-free (0% elongation))}/(electric resistance at elongation-free)×100], is small in each cycle in a second cycle and afterward. Specifically, the increase rate of electric resistance is preferably less than 100%.

Further, in the stretchable electrode, it is preferred that when the aforementioned cycle of stretching and contracting is repeated 1000 times, an increase rate of electric resistance of the electrode main body at 100% elongation in a 1000th cycle to electric resistance of the electrode main body at 100% elongation in a second cycle [{(electric resistance at 100% elongation in 1000th cycle)−(electric resistance at 100% elongation in 2nd cycle))}/(electric resistance at 100% elongation in 2nd cycle)×100], is small. Specifically, the increase rate of electric resistance is preferably 10% or less, and more preferably 5% or less.

Herein, the reason why electric resistance not in a first cycle but in a second cycle and afterward is selected as an evaluation object is that behavior of the electrode main body (manner in which the electric resistance varies) at the time of a first elongation (first cycle) in which the stretchable electrode is elongated from a state of elongation-free, is largely different from that at the time of a second stretching and contracting (second cycle) and afterward. The reason for this is probably that a state of the multi-walled carbon nanotubes constituting the electrode main body is stabilized only after the stretchable electrode is prepared and then elongated one time.

Accordingly, when the stretchable electrode of the present invention is used, it is preferred that the stretchable electrode is stretched and contracted at least one time after production and then used.

It is preferred that the stretchable electrode has a larger elongation rate which the stretchable electrode can endure in uniaxial tension when the stretchable electrode is elongated in a uniaxial direction from a state of elongation-free. Specifically, the elongation rate is preferably 30% or more, more preferably 50% or more, moreover preferably 100% or more, and particularly preferably 200% or more.

The reason for this is that by increasing the elongation rate, it becomes possible to use the stretchable electrode for various uses.

The term "the elongation rate which the stretchable electrode can endure in uniaxial tension" refers to an elongation rate which is equal to or lower than elongation at break in a tensile test according to JIS K 6251 and returns to its original state after releasing a tensile load. For example, "the elongation rate which the stretchable electrode can endure in uniaxial tension is 100% or more" means that the stretchable electrode does not break when being elongated by 100% in a uniaxial direction and returns to its original state after releasing a tensile load (that is, the elongation rate is within a range of an elastic deformation).

The elongation rate which the stretchable electrode can endure in uniaxial tension can be controlled by design of the base (material, shape, etc.).

Next, a method for producing the stretchable electrode of the present invention will be described.

The stretchable electrode of the present invention can be produced, for example, by undergoing:

(1) a step of preparing a base formed of an elastomer composition (hereinafter, also referred to as a "step (1)"); and (2) a step of applying a composition including multi-walled carbon nanotubes having a fiber length of 50 μm or more and a dispersion medium to form an electrode main body integrated with the base (hereinafter, also referred to as a "step (2)").

The method for producing a stretchable electrode will be described below in the order of steps taking a stretchable electrode including a sheet-like base and a laminated electrode main body as an example.

[Step (1)]

In the present step, a base formed of an elastomer composition will be prepared.

At first, a raw material composition is prepared which is formed by mixing, as required, additives such as a chain extender, a crosslinking agent, a vulcanization accelerator, a catalyst, a dielectric filler, a plasticizer, an antioxidant, an age resistor and a coloring agent in the elastomer (or its raw material).

Next, a base is prepared by forming the raw material composition. Herein, a method of forming the raw material composition is not particularly limited, and publicly known methods can be employed.

Specifically, when as the base, a base containing a urethane elastomer is prepared, for example, at first, a polyol component, a plasticizer and an antioxidant are weighed and mixed/stirred for a given period of time under conditions of heating and reduced pressure to prepare a mixed solution. Next, the mixed solution is weighed, its temperature is adjusted, and then a catalyst is added and the resulting mixture is stirred with AJITER or the like. Thereafter, a predetermined amount of an isocyanate component is added, and the resulting mixture is stirred with AJITER or the like, immediately injected into a forming apparatus shown in FIG. 3, and the resulting formed product is cross-linked/cured while being carried in a state of being sandwiched between protection films to obtain a rolled sheet with protection films, which has a predetermined thickness. Thereafter, the rolled sheet is further subjected to a cross-linking reaction for a given period of time in a furnace, and thereby a base can be produced.

Figure 3:
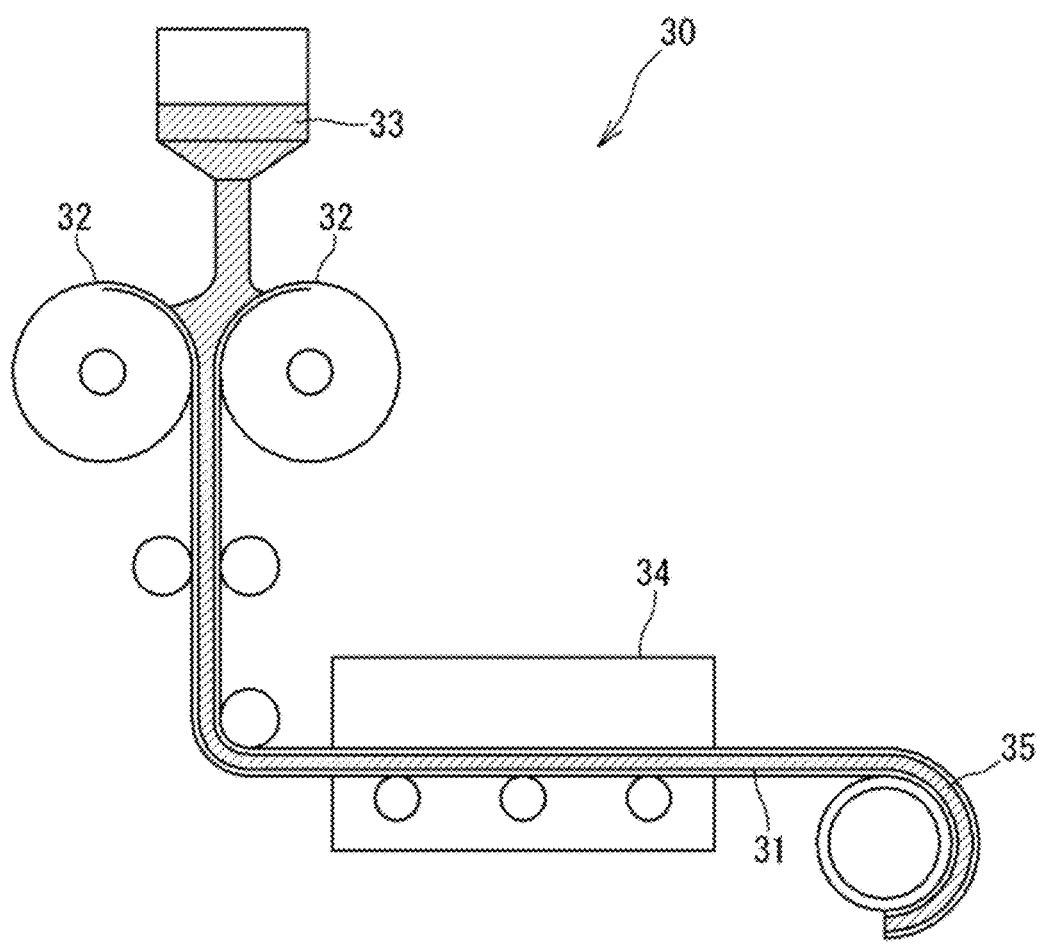
FIG. 3 is a schematic view for explaining an example of a forming apparatus to be used for preparation of the sheet-like base.

In addition, FIG. 3 is a schematic view for explaining an example of a forming apparatus to be used for preparation of the sheet-like base. In the forming apparatus 30 shown in FIG. 3, a raw material composition 33 is poured into a gap between protection films 31 made of polyethylene terephthalate (PET) continuously sent out from a pair of rollers 32, 32 placed apart from each other, and introduced into a heating unit 34 in a state of holding the raw material composition 33 in the gap while allowing a curing reaction (crosslinking reaction) to proceed, and the raw material composition 33 is thermally cured in a state of being held between the pair of protection films 31 to form a sheet-like base 35.

The base may be prepared using a general-purpose film forming apparatus or a film forming method such as various coating apparatuses, bar coating or doctor blade coating after preparing a raw material composition.

[Step (2)]

In the present step, at first, a composition including multi-walled carbon nanotubes having a fiber length of 50 μm or more and a dispersion medium (carbon nanotube dispersion liquid) is applied. Thereafter, an electrode main body integrated with the base is formed by removing the dispersion medium through drying treatment.

Specifically, at first, multi-walled carbon nanotubes are added to a dispersion medium. In this time, as required, other components described above such as a binder component (or a raw material of the binder component) or a dispersant may be further added.

Then, the respective components including the multi-walled carbon nanotubes are dispersed (or dissolved) in the dispersion medium by using a wet type dispersing machine, and thereby an application liquid (carbon nanotube dispersion liquid) is prepared. Herein, the respective components may be dispersed by using an existing dispersing machine such as an ultrasonic dispersing machine, a jet mill, a beads mill.

Examples of the dispersion medium include toluene, methyl isobutyl ketone (MIBK), alcohols, water and the like. These dispersion media may be used singly, or may be used in combination of two or more thereof.

In the application liquid, a concentration of the multi-walled carbon nanotube is preferably 0.01 to 10% by weight.

When the concentration is lower than 0.01% by weight, the concentration of the multi-walled carbon nanotube is too low, and therefore the application liquid may need to be applied repeatedly. On the other hand, when the concentration is higher than 10% by weight, there may be cases where the dispersibility of the multi-walled carbon nanotubes is deteriorated because of too high viscosity of the application liquid and because of recoagulation of carbon nanotubes, leading to difficulty in formation of a uniform electrode main body.

Subsequently, the application liquid is applied to a predetermined location on a surface of the base by spray coating, and dried. In this time, the application liquid may be applied after masking, as required, onto a location on the electrode surface where the electrode main body is not formed.

Drying conditions of the application liquid are not particularly limited and may be appropriately selected in accordance with the kind of the dispersion medium, composition of the elastomer composition or the like.

A method of applying the application liquid is not limited to spray coating, and as other methods, for example, a screen printing method, an ink-jet printing method and the like can also be employed.

In addition, in some cases, the surface of the base may be subjected to a pretreatment before forming the electrode main body in order to enhance the adhesion between the base and the electrode main body. However, since the electrode main body formed using the multi-walled carbon nanotubes has extremely excellent adhesion to the base, sufficient adhesion between the base and the electrode main body can be ensured without applying any pretreatment.

By undergoing such steps, a stretchable electrode having a configuration as shown in FIGS. 1A and 1B or FIG. 2C can be produced.

Further, when a stretchable electrode having a configuration as shown in FIG. 2A is produced, a stretchable electrode can be produced, for example, by forming an electrode main body on one surface of the base by the method described above, applying the aforementioned raw material composition by using a general-purpose film forming apparatus or a film forming method such as various coating apparatuses, bar coating and doctor blade coating, and then thermally curing the raw material composition. Further, the stretchable electrode can also be produced by separately preparing a sheet (base) obtained by crosslinking or semi-crosslinking a raw material composition for preparing the base, and laminating the sheet on a base having an electrode main body formed on one surface thereof. In the case of semi-crosslinking, the aforementioned sheet may be fully crosslinked after being laminated.

Further, when producing a stretchable electrode in which the base and the electrode main body respectively have a multi-layer structure like the stretchable electrode shown in FIG. 2B, a base is prepared at first, and then thereon, an electrode main body and another base may be laminated in order by the method described above to produce a stretchable electrode having a multi-layer structure.

Such a stretchable electrode of the present invention can be suitably used, for example, as a sensor sheet. Naturally, use of the stretchable electrode of the present invention is not limited to the sensor sheet, and the stretchable electrode can be used for use of a conducting wire material as other use, as a matter of course, and various uses such as a dielectric elastomer type actuator and generator, and various signal wires and power lines of low electric power at locations requiring flexibility in stretching.

Next, the sensor sheet of the present invention will be described.

A sensor sheet of the present invention is a sensor sheet using the stretchable electrode of the present invention, wherein the base is sheet-like and the electrode main body is disposed on both surfaces of the base, and the electrode main body disposed on one surface of the base and the electrode main body disposed on the other surface of the base are at least partially opposed to each other with the base interposed therebetween.

In the sensor sheet of the present invention, the electrode main body is disposed on both surfaces of the base, and the electrode main body disposed on one surface of the base and the electrode main body disposed on the other surface of the base are at least partially opposed to each other with the base interposed therebetween. Therefore, a capacitor using the base as a dielectric layer is configured by the stretchable electrode of the present invention.

Thus, in the sensor sheet of the present invention, a capacitance of a portion in which the electrode main bodies are opposed to each other with the base interposed therebetween changes by stretching and contracting of the dielectric layer (base) and the electrode main bodies following the dielectric layer. Therefore, the sensor sheet can be suitably used for, for example, a capacitive sensor which detects an amount of strain due to deformation or the like by measuring the changes in capacitance.

Further, in the sensor sheet, the electrode main body is rectangular and plural rows of the electrode main bodies may be disposed on both surfaces of the base. In this case, a distribution of strain due to deformation and a surface pressure distribution can also be measured by detecting an amount of strain due to deformation for every portion where the electrode main bodies are opposed to each other with the base interposed therebetween.

A capacitive sensor sheet using the aforementioned stretchable electrode and including plural rows of electrode main bodies will be described in more detail in reference to drawings.

Figure 4A:
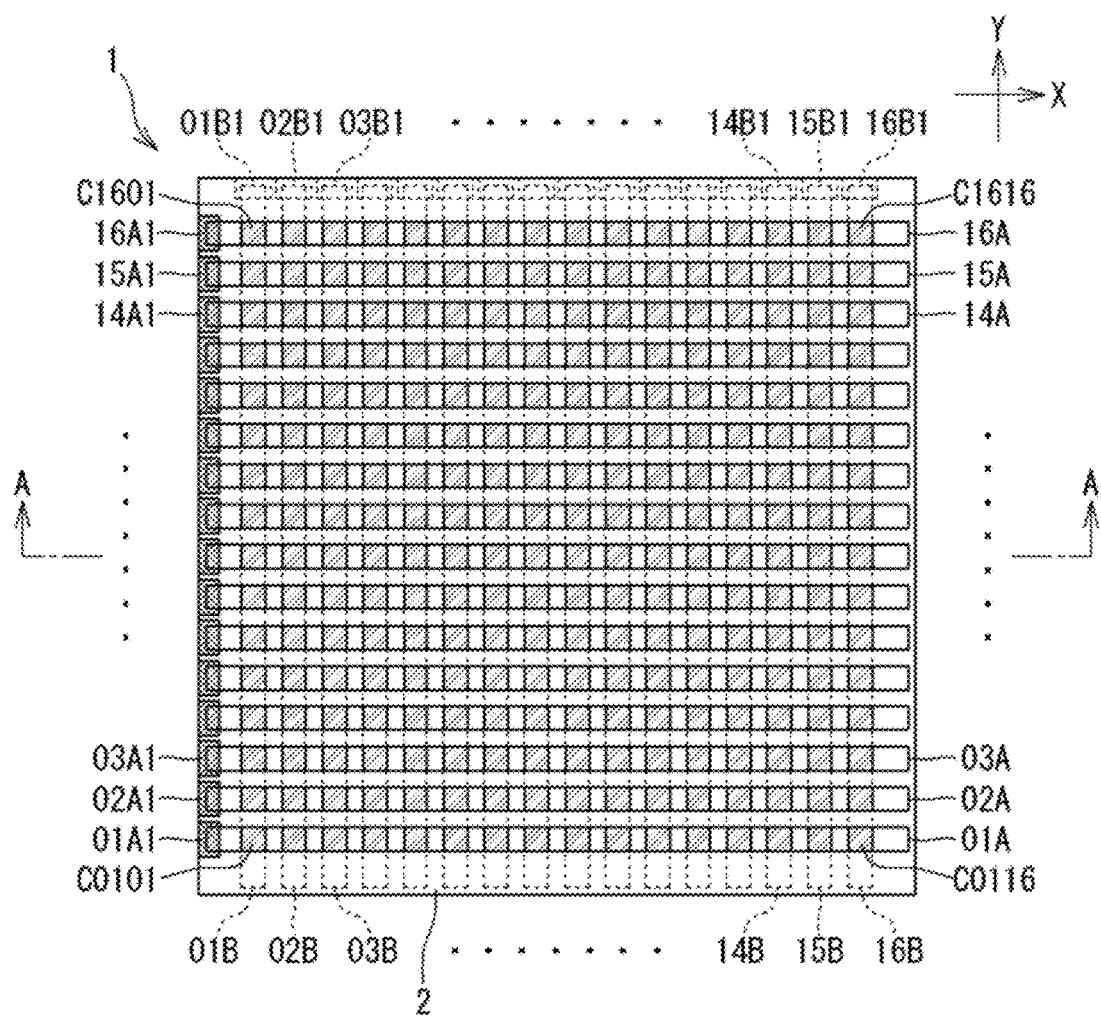
FIG. 4A is a plan view schematically showing an example of the sensor sheet of the present invention.
Figure 4B:
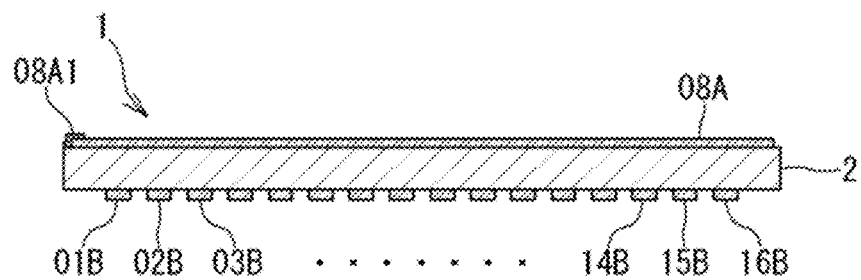
FIG. 4B is a sectional view take on line A-A of the sensor sheet shown in FIG. 4A.

FIG. 4A is a plan view schematically showing an example of the sensor sheet of the present invention, and FIG. 4B is a sectional view take on line A-A of the sensor sheet shown in FIG. 4A.

A sensor sheet 1 shown in FIGS. 4A and 4B is a capacitive sensor sheet, and includes a sheet-like dielectric layer 2, plural rows of rectangular top electrode layers 01A to 16A laminated on the surface (top surface) of the dielectric layer 2, plural rows of rectangular bottom electrode layers 01B to 16B laminated on the bottom surface of the dielectric layer 2, top connecting portions 01A1 to 16A1 for connection to external conducting wires which are disposed at one ends of the top electrode layers 01A to 16A, and bottom connecting portions 01B1 to 16B1 for connection to external conducting wires which are disposed at one ends of the bottom electrode layers 01B to 16B.

In the sensor sheet 1, portions at which the top electrode layers 01A to 16A and the bottom electrode layers 01B to 16B are opposed to each other with the dielectric layer 2 interposed therebetween (portions at which the top electrode layers 01A to 16A and the bottom electrode layers 01B to 16B intersect as viewed from the thickness direction of the dielectric layer) serve as detection portions C0101 to C1616. In addition, left two-digit "○○" in symbols "C○○ΔΔ" of the detection portion corresponds to the top electrode layers 01A to 16A, and right two-digit "ΔΔ" corresponds to the bottom electrode layers 01B to 16B.

The top electrode layers 01A to 16A respectively have a rectangle and are composed of 16 electrode layers laminated on the top surface of the dielectric layer 2. Each of the top electrode layers 01A to 16A extends in an X-direction (lateral direction in FIG. 4A). The top electrode layers 01A to 16A are respectively arranged at predetermined intervals in a Y-direction (vertical direction in FIG. 4A) and in nearly parallel to one another.

The bottom electrode layers 01B to 16B respectively have a rectangle and are composed of 16 electrode layers laminated on the bottom surface of the dielectric layer 2. The bottom electrode layers 01B to 16B are arranged so that each of the bottom electrode layers 01B to 16B intersects the top electrode layers 01A to 16A approximately at a right angle as viewed from the top-bottom direction (thickness direction of the dielectric layer). That is, each of the bottom electrode layers 01B to 16B extends in a Y-direction. Further, the bottom electrode layers 01B to 16B are respectively arranged at predetermined intervals in an X-direction and in nearly parallel to one another.

By arranging each of the top electrode layers 01A to 16A and the bottom electrode layers 01B to 16B as described above, the number of the electrode layers to be arranged and the number of the electrode conducting wires can be reduced in measuring a position and a magnitude of deformation of a measuring object. That is, when the aforementioned aspect is employed, the detection portions are efficiently arranged.

Describing the arrangement in more detail, in an example shown in FIGS. 4A and 4B, detection portions at which the top electrode layers and the bottom electrode layers are opposed to each other with the dielectric layer interposed therebetween, exist at 256 (16×16=256) locations, and if the detection portions positioned at the 256 locations are independently formed, 512 (256×2) conducting wires are required for detecting the capacitance of the detection portion since the top electrode and the bottom electrode exist per each detection portion. On the other hand, like the example shown in FIGS. 4A and 4B, when the top electrode layers and the bottom electrode layers are respectively composed of plural rows of rectangular objects arranged in parallel to one another, and the top electrode layers and the bottom electrode layers are arranged so that each of the top electrode layers is approximately orthogonal to the bottom electrode layers as viewed from the top-bottom direction, detection of the capacitance in the detection portions requires only 32 (16+16) conducting wires. Therefore, as described above, the detection portions are efficiently arranged.

Then, in the sensor sheets 1 shown in FIGS. 4A and 4B, the dielectric layer 2 corresponds to the base in the stretchable electrode of the present invention, and each of the top electrode layers 01A to 16A and the bottom electrode layers 01B to 16B corresponds to the electrode main body in the stretchable electrode of the present invention.

The sensor sheet 1 having such a constitution can be formed into a capacitive sensor by connecting the sensor sheet 1 to a measurement instrument as described later, and a capacitance of each of 256 detection portions can be measured while switching 256 detection portions one by one by switching each of 16 conducting wires by an external switching circuit.

Then, based on the capacitance of each detection portion, information of a distribution of strain, a position of strain, surface pressure distribution and the like within the sensor sheet can be detected.

When the sensor sheet is the capacitive sensor sheet, an average thickness of the dielectric layer is preferably 10 μm or more and 1000 μm or less, and more preferably 30 μm or more and 200 μm or less from the viewpoint of increasing capacitance C to improve detection sensitivity and from the viewpoint of improving followability to the measuring object.

A relative permittivity of the dielectric layer at room temperature is preferably 2 or more, and more preferably 5 or more. When the relative permittivity of the dielectric layer is less than 2, the capacitance C is reduced and therefore there is a possibility that adequate sensitivity may not be attained in using the sensor sheet as a capacitive sensor.

In addition, in the sensor sheet, design of appearance configuration such as the average thickness, width and length of the dielectric layer (base), and the top electrode layer and the bottom electrode layer (electrode main body) can be appropriately modified in accordance with use of the sensor sheet to be used.

Then the sensor sheet of the present invention may be a sensor sheet having, in the sheet, only one detection portion at which the top electrode layer and the bottom electrode layer are opposed to each other with the dielectric layer interposed therebetween.

Further, when the stretchable electrode of the present invention is used as a capacitive sensor sheet, a Young's modulus of the base is preferably 0.1 MPa or more and 1 MPa or less. When the Young's modulus is less than 0.1 MPa, the base is too soft, and therefore processing of high quality may be difficult and adequate measurement accuracy may not be achieved. On the other hand, when the Young's modulus is higher than 1 MPa, there is a possibility that since the base is too hard, it interferes with the action of deformation of the measuring object when a deformation-load of the measuring object is small, and therefore measuring results do not meet an aim of measurement.

Further, when the stretchable electrode is used as a capacitive sensor sheet, hardness of the base is preferably 0 to 30° in terms of the hardness (JIS A hardness) using a type A durometer according to JIS K 6253, or 10 to 55° in terms of the hardness (JIS C hardness) using a type C durometer according to JIS K 7321.

When the C hardness is less than 10°, the base is too soft, and therefore processing of high quality may be difficult and adequate measurement accuracy may not be ensured. On the other hand, when the C hardness is more than 55°, there is a possibility that since the base is too hard, it interferes with the action of deformation of the measuring object when a deformation-load of the measuring object is small, and therefore measuring results do not meet an aim of measurement.

The constitution of the sensor sheet of the present invention is not limited to the constitution shown in FIGS. 4A and 4B, and, for example, a shield electrode layer for eliminating cross-talk noise may be formed on superficial layer sides of the top electrode layer and/or the bottom electrode layer with an insulating layer (dielectric layer) interposed therebetween so as to cover the detection portion. Moreover, an overcoat layer for protecting electrode layer (the top electrode layer, the bottom electrode layer, and the shield electrode layer) may be disposed at the outermost layer of the sensor sheet.

The sensor sheet thus configured can be formed into a capacitive sensor by connecting each of the top electrode layers and bottom electrode layers to a measurement instrument with external conducting wires interposed therebetween, as described later.

A capacitive sensor of the present invention includes the sensor sheet of the present invention, a measurement instrument, and external conducting wires for connecting between the measurement instrument and electrode main bodies (top electrode layers and bottom electrode layers) which the sensor sheet includes, wherein a portion in which the electrode main body disposed on one surface of the base and the electrode main body disposed on the other surface of the base are opposed to each other with the base interposed therebetween is a detection portion, and an amount of strain due to deformation is measured by measuring changes in capacitance in the detection portion.

Figure 5:
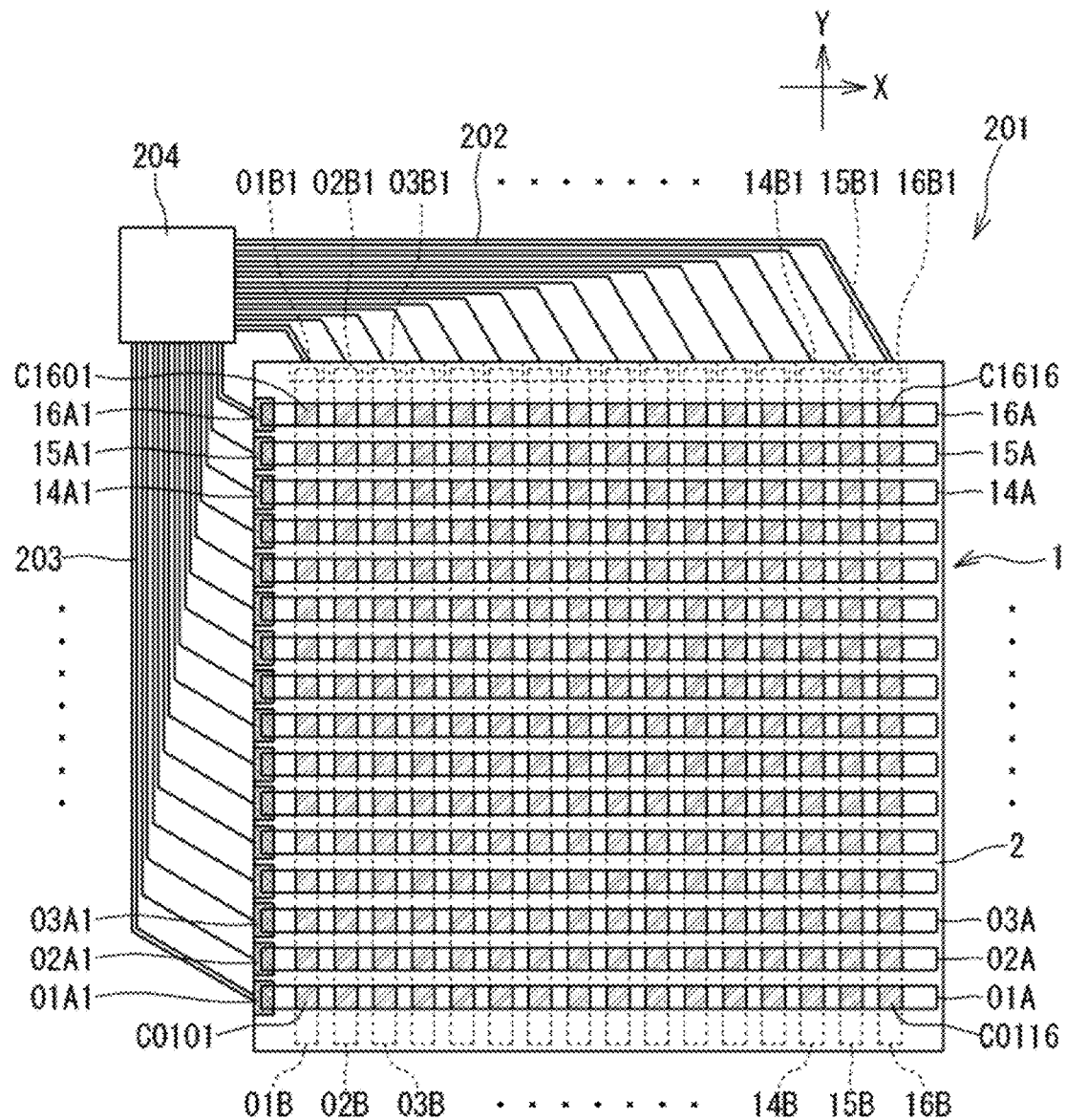
FIG. 5 is a plan view schematically showing an example of a capacitive sensor of the present invention.

Examples of the capacitive sensor using the sensor sheet (stretchable electrode) 1 shown in FIGS. 4A and 4B include one having a constitution as shown in FIG. 5.

FIG. 5 is a plan view schematically showing an example of the capacitive sensor of the present invention.

A capacitive sensor 201 shown in FIG. 5 includes the sensor sheet 1 using the stretchable electrode of the present invention shown in FIGS. 4A and 4B, external conducting wires 202 and 203, and a measurement instrument 204.

Each of the top connecting portions 01A1 to 16A1 of the sensor sheet 1 is connected to the measurement instrument 204 through the external conducting wire 203 formed by binding a plurality (16) of conducting wires together, and each of the bottom connecting portions 01B1 to 16B1 is connected to the measurement instrument 204 through the external conducting wire 202 formed by binding a plurality (16) of conducting wires together.

In addition, the external conducting wires may be connected to only one ends of the top electrode layers and the bottom electrode layers as shown in FIG. 5; however, in some cases, the external conducting wires may be connected to both ends.

The measurement instrument 204 includes, not shown, a power source circuit, a computing circuit, a measuring circuit of capacitance, a switching circuit of pixels and a display device, as required. Specific examples of the measurement instrument 204 include an LCR meter and the like.

In such a capacitive sensor 201, a change amount $\Delta C$ in capacitance is detected from the capacitance C before placing a measuring object and the capacitance C after placing a measuring object, and the amount of strain due to deformation can be determined based on the change amount $\Delta C$ in capacitance, and the distribution of strain due to deformation and the surface pressure distribution can be determined based on the amount of strain due to deformation of each detection portion.

Further, the sensor sheet (stretchable electrode) has a high elongation rate, can be elongated by 30% or more repeatedly in a uniaxial direction, can follow the deformation or action of a flexible measuring object, and has excellent durability for elastic deformation and repeated deformation. Therefore, the capacitive sensor including the sensor sheet can, for example, trace the shape of the measuring object or directly detect the motion of the measuring object.

EXAMPLES

Hereinafter, the present invention will be described in more detail by way of Examples, but the present invention is not limited to the following examples.

<Preparation of Carbon Nanotube Dispersion Liquid>

Preparation Example 1

Preparation of Carbon Nanotube Dispersion Liquid (A-1)

Highly oriented carbon nanotubes (number of layers: 4 to 12, fiber diameter: 10 to 20 nm, fiber length: 50 to 150 μm, carbon purity: 99.5%) (30 mg) produced by TAIYO NIPPON SANSO CORPORATION which are multi-walled carbon nanotubes produced by the substrate growth method were added to methyl isobutyl ketone (MIBK) (30 g), and the resulting mixture was subjected to wet-dispersion treatment by using a jet mill (Nano Jet Pal JN10-SP003, manufactured by JOKOH CO., LTD.) to form a carbon nanotube dispersion liquid A-1 having a concentration of 0.1% by weight.

<Verification of Average Length of Multi-Walled Carbon Nanotubes>

Using a scanning electron microscope (S-4800 manufactured by HITACHI, Ltd.), the highly oriented carbon nanotubes used in Preparation Example 1 were observed at a magnification of 500 times, and the average length of the highly oriented carbon nanotubes (average value of the growth length of CNT forest) was calculated based on a electron microscope image.

Figure 6:
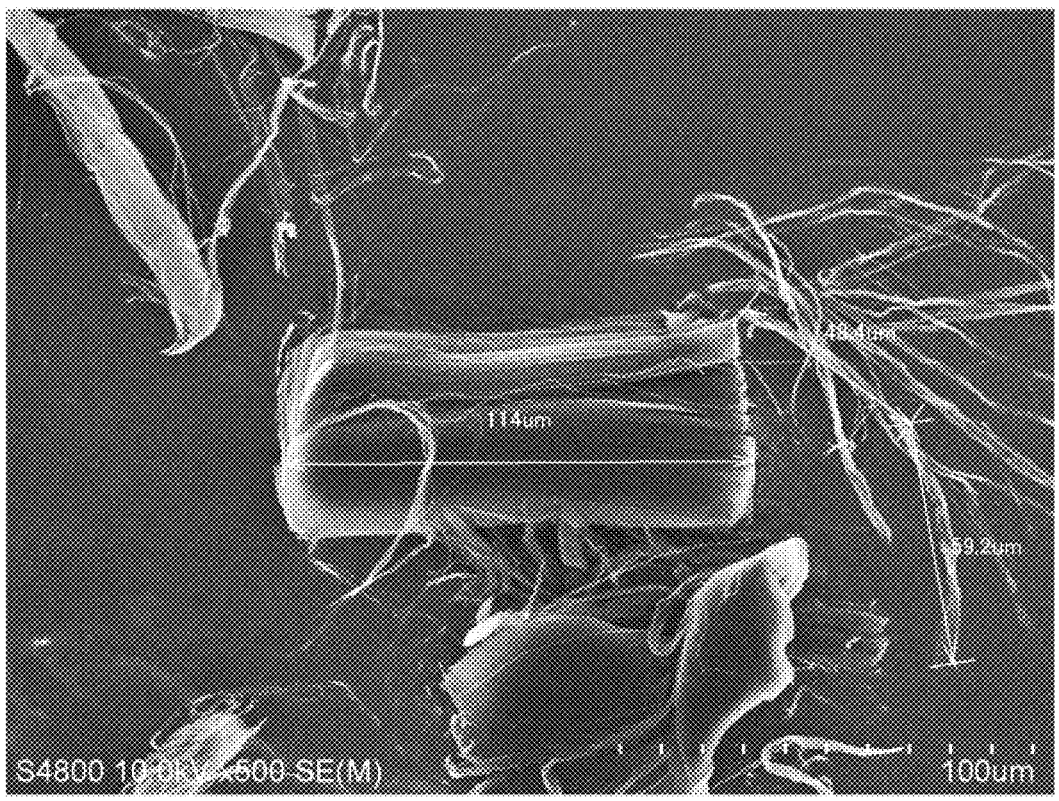
FIG. 6 is an electron microscope photograph (×500) of the highly oriented carbon nanotubes used in Preparation Example 1.

Specifically, a CNT forest portion was selected in the electron microscope photograph as shown in FIG. 6, a length of growth (114 μm in an example of FIG. 6) of the portion was measured, and an average value was calculated.

In this time, a plurality of electron microscope photographs were taken, and an average value of growth lengths in ten locations randomly extracted from the photographs was calculated.

The average length of the highly oriented carbon nanotubes used in Preparation Example 1 was 102 μm.

In addition, FIG. 6 is one of electron microscope photographs obtained by photographing the highly oriented carbon nanotubes used in Preparation Example 1

<Verification of Average Fiber Diameter of Multi-Walled Carbon Nanotubes>

Using a scanning electron microscope (S-4800 manufactured by HITACHI, Ltd.), the highly oriented carbon nanotubes used in Preparation Example 1 were observed at a magnification of 200000 times, and the average fiber diameter of the highly oriented carbon nanotubes was calculated based on a electron microscope image.

Figure 7:
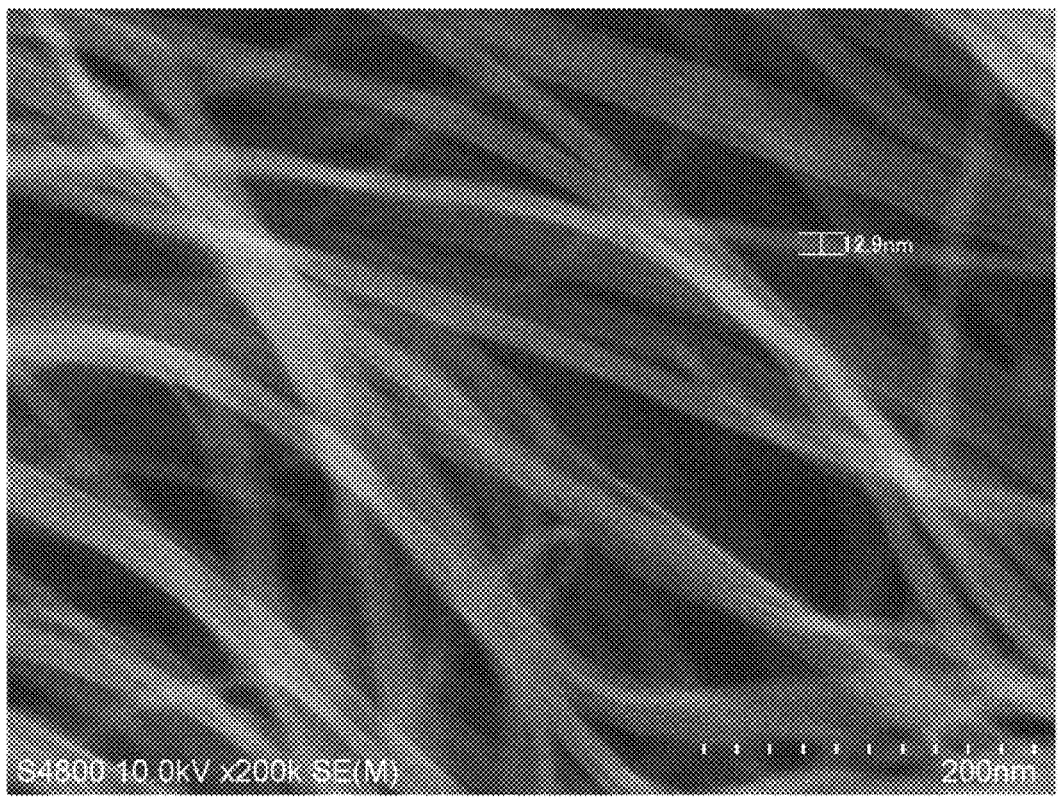
FIG. 7 is an electron microscope photograph (×200000) of the highly oriented carbon nanotubes used in Preparation Example 1.

Specifically, a carbon nanotube singly observed was randomly extracted in the electron microscope photograph as shown in FIG. 7, a fiber diameter (12.9 μm in an example of FIG. 7) of the carbon nanotube was measured, and an average was calculated.

In this time, a plurality of electron microscope photographs were taken, and an average value of fiber diameters in ten locations randomly extracted from the photographs was calculated.

The average fiber diameter of the highly oriented carbon nanotubes used in Preparation Example 1 was 12.8 nm.

In addition, FIG. 7 is one of electron microscope photographs obtained by photographing the highly oriented carbon nanotubes used in Preparation Example 1.

Preparation Example 2

Preparation of Carbon Nanotube Dispersion Liquid (A-2)

Highly oriented carbon nanotubes (number of layers: 4 to 12, fiber diameter: 10 to 20 nm, fiber length: 150 to 300 μm, carbon purity: 99.5%) produced by TAIYO NIPPON SANSO CORPORATION which are different in fiber length from Preparation Example 1 were used as the multi-walled carbon nanotubes, and a carbon nanotube dispersion liquid A-2 having a concentration of 0.1% by weight was prepared in the same manner as in Preparation Example 1.

The average length and the average fiber diameter of the highly oriented carbon nanotubes used in the present example were calculated in the same manner as in Preparation Example 1, and consequently the average length was 298 μm and the average fiber diameter was 12.9 nm.

Preparation Example 3

Preparation of Carbon Nanotube Dispersion Liquid (A-3))

Highly oriented carbon nanotubes (number of layers: 4 to 12, fiber diameter: 10 to 20 nm, length: 300 to 600 μm, carbon purity: 99.5%) produced by TAIYO NIPPON SANSO CORPORATION which are different in fiber length from Preparation Example 1 were used as the multi-walled carbon nanotubes, and a carbon nanotube dispersion liquid A-3 having a concentration of 0.1% by weight was prepared in the same manner as in Preparation Example 1.

The average length and the average fiber diameter of the highly oriented carbon nanotubes used in the present example were calculated in the same manner as in Preparation Example 1, and consequently the average length was 591 μm and the average fiber diameter was 11.1 nm.

Preparation Example 4

Preparation of Carbon Nanotube Dispersion Liquid (B)

A carbon nanotube dispersion liquid B having a concentration of 0.1% by weight was prepared in the same manner as in the preparation method of the carbon nanotube dispersion liquid (A-1) except for using NC 7000 (fiber diameter: 9.5 nm, average length: 1.5 μm, aspect ratio: 158, carbon purity: 90%) produced by NANOCYL S.A. which was multi-walled carbon nanotubes in place of the highly oriented carbon nanotubes produced by TAIYO NIPPON SANSO CORPORATION.

Preparation Example 5

Preparation of Carbon Nanotube Dispersion Liquid (C)

A carbon nanotube dispersion liquid C having a concentration of 0.1% by weight was prepared in the same manner as in the preparation method of the carbon nanotube dispersion liquid (A-1) except for using Super-Growth CNT (median value of a fiber diameter: about 3 nm, growth length: 500 to 700 μm, aspect ratio: about 100000, carbon purity: 99.9%, provided by National Institute of Advanced Industrial Science and Technology) which was single-walled carbon nanotubes in place of the highly oriented carbon nanotubes produced by TAIYO NIPPON SANSO CORPORATION.

Example 1

(1) Liquid hydrogenated hydroxyl group-terminated polyolefin polyol (EPOL, produced by Idemitsu Kosan Co., Ltd.) (100 parts by mass) and a high temperature lubricating oil (MORESCO-HILUBE LB-100, produced by MORESCO Corporation) predominantly composed of alkyl-substituted diphenyl ether (100 parts by mass) were weighed, and stirred/mixed at a rotational speed of 2000 rpm for 3 minutes by using a planetary centrifugal mixer (manufactured by THINKY CORPORATION). Next, to the resulting mixture, a catalyst (Fomrez Catalyst UL-28, produced by Momentive Performance Materials Inc.) (0.07 parts by mass) was added, and the resulting mixture was stirred for 1.5 minutes by using a planetary centrifugal mixer. Thereafter, isophorone diisocyanate (Desmodur I, produced by Sumika Bayer Urethane Co., Ltd.) (11 parts by mass) was added, and the resulting mixture was stirred for 3 minutes by using a planetary centrifugal mixer, defoamed for 1.5 minutes to form a raw material composition for a base, and then the raw material composition was injected into the forming apparatus 30 shown in FIG. 3, and cross-linked/cured under conditions of a temperature of 110° C. and a retention time of 30 minutes in a furnace while being carried in a state of being sandwiched between protection films to obtain a rolled sheet with protection films, which has a predetermined thickness. Thereafter, the obtained sheet was post-cross-linked for 12 hours in a furnace adjusted to 80° C. to obtain a base sheet having a thickness of 50 µm.

Then, the obtained base sheet was cut to prepare a base having a size of 90 mm×90 mm×50 µm and a base having a size of 90 mm×60 mm×50 µm.

(2) Next, 8 g of the carbon nanotube dispersion liquid (A-1) was applied in a shape of rectangle onto a central portion of a surface of one (90 mm×90 mm×50 µm) base by spray coating, and dried at 100° C. for 30 minutes to form an electrode main body of 20 mm wide, 80 mm long and 1 µm thick.

Moreover, a 0.2% by weight toluene solution formed by dissolving a composition having the same formula as that of the raw material composition for a base into toluene was prepared, and 4 g of the 0.2% by weight toluene solution was applied, as a primer, onto the electrode main body in a shape of rectangle by spray coating, and dried at 100° C. for 30 minutes. In this case, both ends (areas within 8 mm of ends) of the electrode main body were masked before spray coating.

Further, spray coating was performed by using KIDS-102 (manufactured by AIRTEX Co., Ltd.) as an airbrush, releasing a nozzle by only one revolution from a state of being completely closed, and setting a distance from a nozzle tip to an application surface to 10 cm.

Thereafter, the base provided with the electrode main body was bonded to another (90 mm×60 mm×50 µm) base so as to sandwich the electrode main body therebetween, so that a stretchable electrode was obtained.

Example 2

A stretchable electrode was prepared in the same manner as in Example 1 except for using the carbon nanotube dispersion liquid (A-2) in place of the carbon nanotube dispersion liquid (A-1).

Example 3

A stretchable electrode was prepared in the same manner as in Example 1 except for using the carbon nanotube dispersion liquid (A-3) in place of the carbon nanotube dispersion liquid (A-1).

Comparative Example 1

A stretchable electrode was prepared in the same manner as in Example 1 except for using the carbon nanotube dispersion liquid (B) in place of the carbon nanotube dispersion liquid (A-1).

Comparative Example 2

A stretchable electrode was prepared in the same manner as in Example 1 except for using the carbon nanotube dispersion liquid (C) in place of the carbon nanotube dispersion liquid (A-1).

(Evaluation: Measurement of Change in Electric Resistance on Repeated Stretching and Contracting)

Figure 8:
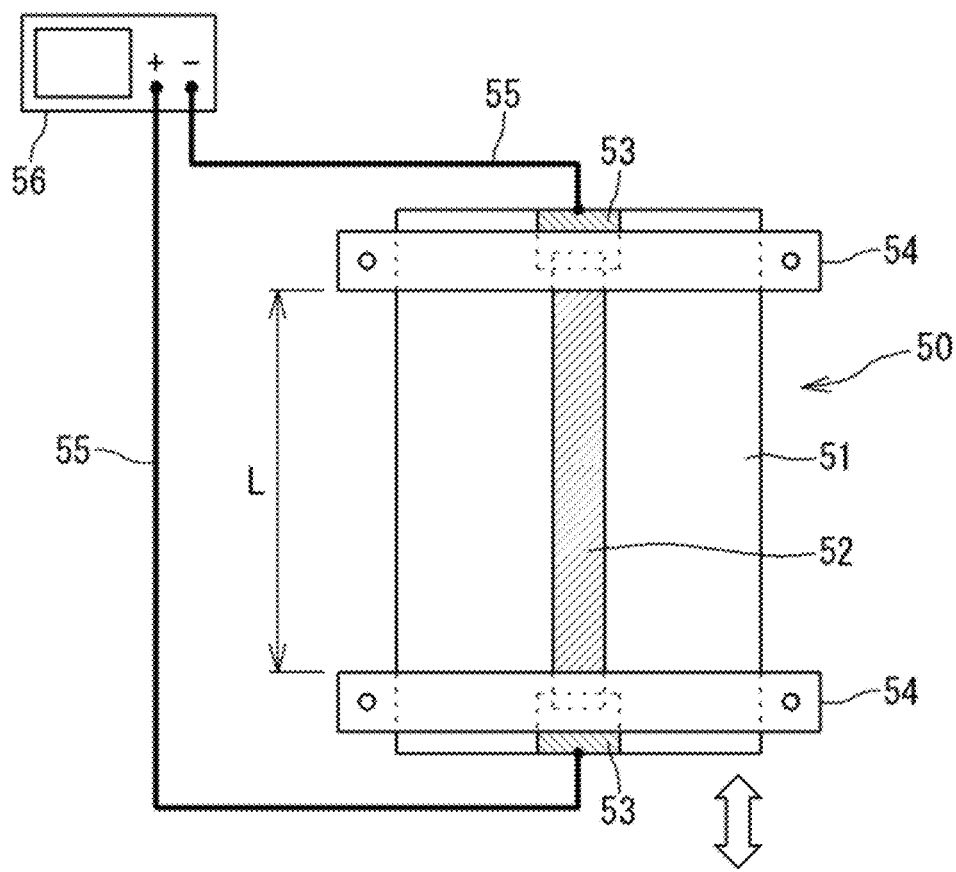
FIG. 8 is a schematic view for explaining a method of measuring electric resistance during repeated stretching and contracting in Examples and Comparative Examples.
Figure 9:
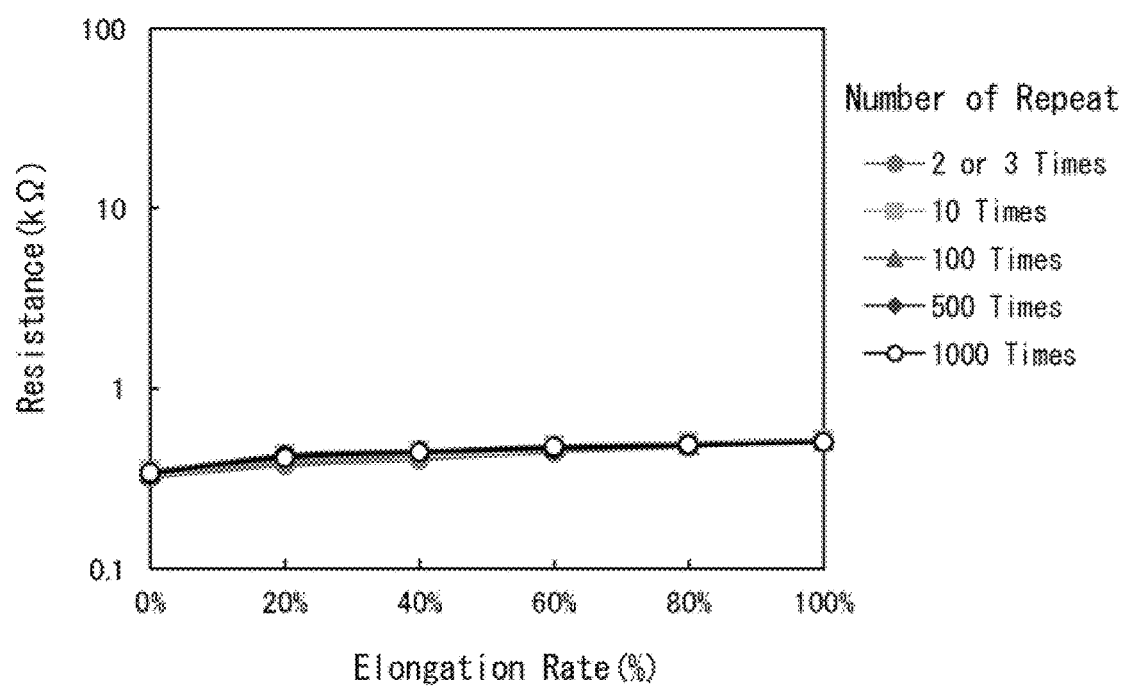
FIG. 9 is a graph showing measurement results in measuring changes in electric resistance on repeated stretching and contracting in Example 1.
Figure 10:
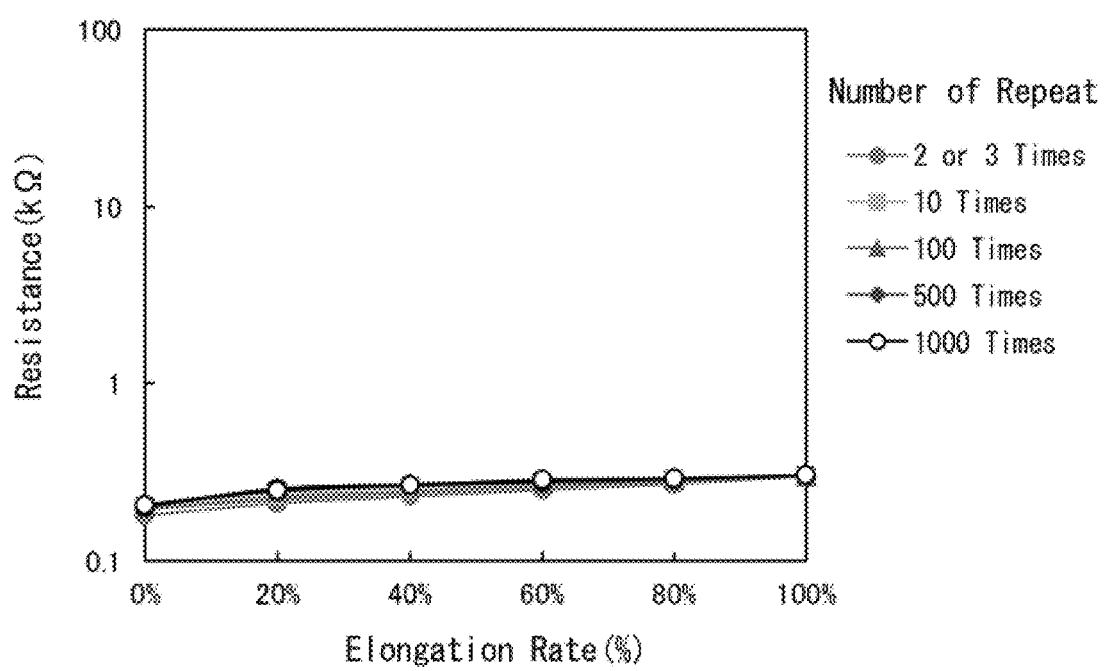
FIG. 10 is a graph showing measurement results in measuring changes in electric resistance on repeated stretching and contracting in Example 2.
Figure 11:
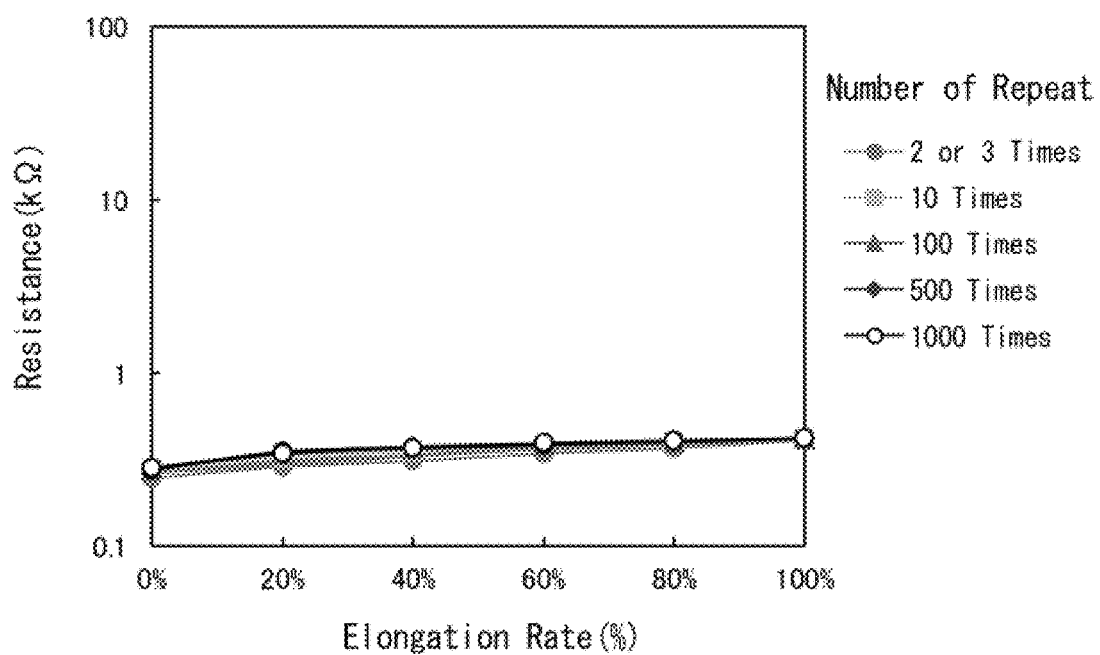
FIG. 11 is a graph showing measurement results in measuring changes in electric resistance on repeated stretching and contracting in Example 3.
Figure 12:
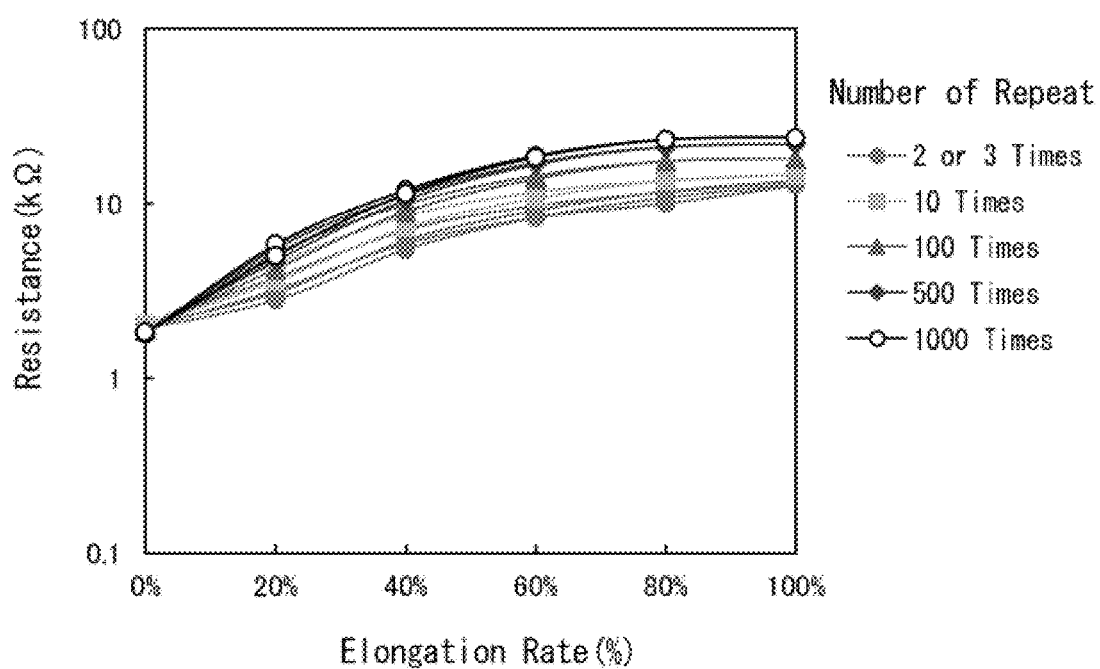
FIG. 12 is a graph showing measurement results in measuring changes in electric resistance on repeated stretching and contracting in Comparative Example 1.
Figure 13:
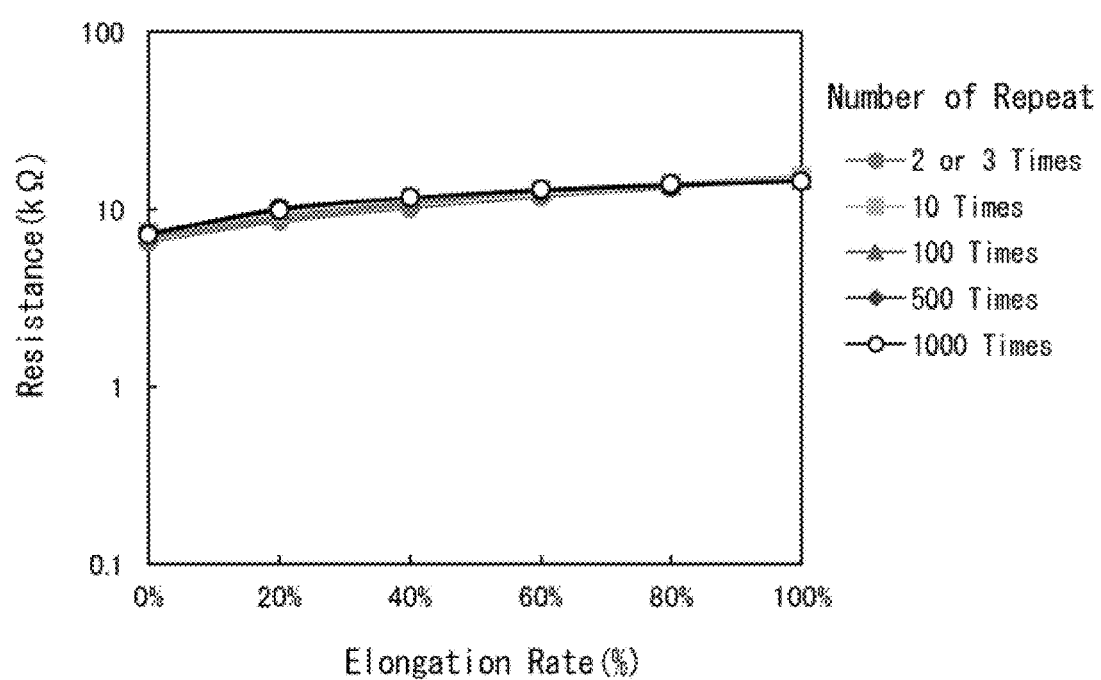
FIG. 13 is a graph showing measurement results in measuring changes in electric resistance on repeated stretching and contracting in Comparative Example 2.

On each stretchable electrode obtained in Examples and Comparative Examples, a cycle of stretching and contracting in which a cycle of elongating the stretchable electrode by 100% in a uniaxial direction (a longitudinal direction of the electrode main body) from a state of elongation-free and then returning the electrode to a state of elongation-free is designated as one cycle, is repeated 1000 times using an evaluation apparatus shown in FIG. 8. The electric resistance of the electrode main body at 2nd to 3rd cycles, a 10th cycle, a 100th cycle, a 500th cycle and a 1000th cycle was measured.

Specifically, as shown in FIG. 8, a copper foil 53 was attached to each of both ends of an electrode main body 52 integrated with a base 51 with a conducting grease (not shown) sandwiched therebetween, each of two sides of a stretchable electrode 50 which are perpendicular to the electrode main body 52, was restricted by a resin frame 54, and each of copper foils 53 attached to both ends of the electrode main body 52 was connected to a multimeter (R6441C manufactured by ADVANTEST CORPORATION) 56 through a lead 55. A cycle of stretching and contracting in which a distance between the frames was elongated in a uniaxial direction (direction of an arrow in the drawing), and then returned to a state of elongation-free, was performed repeatedly and changes in electric resistance were measured. In this case, the distance between the frames (indicated by "L" in FIG. 8) was set to 50 mm.

Measurement results were plotted as a graph in which a vertical axis represents the resistance (logarithmic graduation) and a horizontal axis represents the elongation rate, and were shown in FIGS. 9 to 13. Moreover, on stretchable electrodes of Examples 1 to 3 and Comparative Examples 1 to 2, the electric resistance at elongation-free (0% elongation) and at 100% elongation of each of a 2nd cycle and a 1000th cycle are shown in the following Table 1.

TABLE 1

| | Electric Resistance in 2nd Cycle (kΩ) | | Electric Resistance in 1000th Cycle (kΩ) | |
|---|---|---|---|---|
| | at 0% Elongation | at 100% Elongation | at 0% Elongation | at 100% Elongation |
| Example 1 | 0.32 | 0.52 | 0.34 | 0.50 |
| Example 2 | 0.22 | 0.30 | 0.21 | 0.30 |
| Example 3 | 0.30 | 0.41 | 0.28 | 0.42 |
| Comparative Example 1 | 1.90 | 12.9 | 1.80 | 23.9 |
| Comparative Example 2 | 6.50 | 15.4 | 7.20 | 14.4 |

As is apparent from the results shown in Table 1 and FIGS. 9 to 13, in the stretchable electrode including an electrode main body formed by using multi-walled carbon nanotubes having a fiber length of 50 μm or more, the electric conductivity was excellent (electric resistance itself was low), there is little increase of the electric resistance in being elongated by 100%, and variation in the electric resistance during repeated stretching and contracting were little found.

On the other hand, in the example (Comparative Example 1) in which the stretchable electrode includes an electrode main body formed of multi-walled carbon nanotubes having a short average length of about 10 μm, the electric conductivity was low, increase of the electric resistance in being elongated, and variation in the electric resistance during repeated stretching and contracting were remarkable. Further, in the example (Comparative Example 2) in which the stretchable electrode includes an electrode main body formed of single-walled carbon nanotubes, the electric conductivity was low.

INDUSTRIAL APPLICABILITY

The stretchable electrode of the present invention can be used for various uses such as sensor sheets, conducting wire materials, dielectric elastomer type actuators, generators, and various signal wires and power lines of low electric power at locations requiring flexibility in stretching, and can be suitably used as a sensor sheet of a capacitive sensor or the like which requires stretchability and flexibility.

The invention claimed is:

1. A sensor sheet using a stretchable electrode comprising a base formed of an elastomer composition and an electrode main body integrated with the base,
   wherein the electrode main body is formed using multi-walled carbon nanotubes having an average length in the range of 102 μm to 600 μm;
   wherein the base is sheet-like and the electrode main body is disposed on both surfaces of the base; and
   wherein the electrode main body disposed on one surface of the base and the electrode main body disposed on the other surface of the base are at least partially opposed to each other with the base interposed therebetween.

2. A sensor sheet according to claim 1, wherein the multi-walled carbon nanotube has a fiber diameter of 5 to 30 nm.

3. A sensor sheet according to claim 1,
   wherein the multi-walled carbon nanotube has a fiber diameter of 5 to 30 nm.

4. A sensor sheet using a stretchable electrode comprising:
a base formed of an elastomer composition and an electrode main body integrated with the base,
   wherein the electrode main body is formed using multi-walled carbon nanotubes having an average length in the range of 102 μm to 600 μm;
   wherein the base is sheet-like and the electrode main body is disposed on both surfaces of the base;
   wherein the electrode main body disposed on one surface of the base and the electrode main body disposed on the other surface of the base are at least partially opposed to each other with the base interposed therebetween; and
   wherein the electrode main body is rectangular and plural rows of the electrode main bodies are disposed on both surfaces of the base.

5. A sensor sheet according to claim 1, wherein the multi-walled carbon nanotube has a fiber diameter of 5 to 30 nm.

6. A sensor sheet according to claim 4,
   wherein the multi-walled carbon nanotube has a fiber diameter of 5 to 30 nm.

7. A capacitive sensor of claim 4, wherein the electrode main body is rectangular and plural rows of the electrode main bodies are disposed on both surfaces of the base.

8. A capacitive sensor comprising:
   a sensor sheet using a stretchable electrode comprising a base formed of an elastomer composition and an electrode main body integrated with the base,
   a measurement instrument, and
   external conducting wires for connecting between the measurement instrument and the electrode main body,
      wherein the electrode main body is formed using multi-walled carbon nanotubes having a fiber length of 50 μm or more;
      wherein the base is sheet-like and the electrode main body is disposed on both surfaces of the base;
      wherein the electrode main body disposed on one surface of the base and the electrode main body disposed on the other surface of the base are at least partially opposed to each other with the base interposed therebetween;
      wherein a portion in which the electrode main body disposed on one surface of the base and the electrode main body disposed on the other surface of the base are opposed to each other with the base interposed therebetween is a detection portion; and
      wherein the measurement instrument measures an amount of strain due to deformation by measuring changes in capacitance in the detection portion.

9. A capacitive sensor of claim 8, wherein the multi-walled carbon nanotube has a fiber diameter of 5 to 30 nm.

10. A capacitive sensor of claim 9, wherein the electrode main body is rectangular and plural rows of the electrode main bodies are disposed on both surfaces of the base.

11. A capacitive sensor of claim 8,
    wherein the multi-walled carbon nanotube has a fiber diameter of 5 to 30 nm.

12. A capacitive sensor of claim 11, wherein the electrode main body is rectangular and plural rows of the electrode main bodies are disposed on both surfaces of the base.

13. A capacitive sensor of claim 8, wherein the electrode main body is rectangular and plural rows of the electrode main bodies are disposed on both surfaces of the base.

* * * * *

UNITED STATES PATENT AND TRADEMARK OFFICE
CERTIFICATE OF CORRECTION

| | | |
|---|---|---|
| PATENT NO. | : 10,184,779 B2 | Page 1 of 1 |
| APPLICATION NO. | : 15/039847 | |
| DATED | : January 22, 2019 | |
| INVENTOR(S) | : Hideki Norisada et al. | |

It is certified that error appears in the above-identified patent and that said Letters Patent is hereby corrected as shown below:

On the Title Page

At Column 2, below the Abstract Delete "13 Claims, 13 Drawing Sheets" and insert --8 Claims, 13 Drawing Sheets--

(56) References Cited, pg. 2, Column 2 Delete "TW 1394303 B1"

In the Claims

Column 21, Lines 45-47, Claim 3 Delete entire claim "A sensor sheet according to claim 1, wherein the multi-walled carbon nanotube has a fiber diameter of 5 to 30 nm."

Column 22, Lines 7-9, Claim 5 Delete entire claim "A sensor sheet according to claim 1, wherein the multi-walled carbon nanotube has a fiber diameter of 5 to 30 nm."

Column 22, Lines 13-15, Claim 7 Delete entire claim "A capacitive sensor of claim 4, wherein the electrode main body is rectangular and plural rows of the electrode main bodies are disposed on both surfaces of the base."

Column 22, Lines 46-48, Claim 11 Delete entire claim "A capacitive sensor of claim 8, wherein the multi-walled carbon nanotube has a fiber diameter of 5 to 30 nm."

Column 22, Lines 49-51, Claim 12 Delete entire claim "A capacitive sensor of claim 11, wherein the electrode main body is rectangular and plural rows of the electrode main bodies are disposed on both surfaces of the base."

Signed and Sealed this
Seventh Day of July, 2020

Andrei Iancu
*Director of the United States Patent and Trademark Office*